(12) United States Patent
Massedonio

(10) Patent No.: US 6,414,601 B1
(45) Date of Patent: Jul. 2, 2002

(54) SYSTEM AND METHOD FOR FIRE CONTROL DURING AND AFTER EARTHQUAKES

(75) Inventor: Hugo A Massedonio, Penticton (CA)

(73) Assignee: 467768 B.C. Ltd., Surrey (CA)

( * ) Notice: Subject to any disclaimer, the term of this patent is extended or adjusted under 35 U.S.C. 154(b) by 0 days.

(21) Appl. No.: 09/461,997

(22) Filed: Dec. 15, 1999

(51) Int. Cl.[7] .............................................. G08B 21/00
(52) U.S. Cl. .................. 340/690; 137/39; 200/61.45 R
(58) Field of Search .......................... 340/690; 361/170, 361/191; 307/121, 119; 137/38, 45, 46, 39; 200/61.45 R

(56) References Cited

U.S. PATENT DOCUMENTS

| | | | | |
|---|---|---|---|---|
| 4,098,284 A | * | 7/1978 | Yamada | 139/39 |
| 4,390,922 A | * | 6/1983 | Pelliccia | 361/170 |
| 4,414,994 A | * | 11/1983 | Hogan | 137/38 |
| 4,833,461 A | * | 5/1989 | Yeager | 340/690 |
| 4,841,287 A | * | 6/1989 | Flig et al. | 340/690 |
| 5,420,380 A | * | 5/1995 | Harben et al. | 340/690 |
| 5,489,889 A | * | 2/1996 | Kambouris | 340/540 |
| 5,960,807 A | * | 10/1999 | Reyman | 137/1 |

\* cited by examiner

Primary Examiner—Anh V. La
(74) Attorney, Agent, or Firm—Schwegman, Lundberg, Woessner & Kluth, P.A.

(57) ABSTRACT

A system and method of disabling utility service supplied to a building during and after an earthquake. A shock sensor for sensing seismic activity is provided and a seismic activity threshold is established. Seismic activity is sensed over time and the seismic activity sensed is compared to the seismic activity threshold. When seismic activity exceeds the seismic activity threshold, utility service is cut off to the building.

21 Claims, 4 Drawing Sheets

SYSTEM AND METHOD FOR FIRE CONTROL DURING AND AFTER EARTHQUAKES

FIELD OF THE INVENTION

The present invention is related to system and methods for fire safety, and more particularly to a system and method for fire control during and after earthquakes.

BACKGROUND INFORMATION

Damage from earthquakes arises not only due to the seismic activity itself but also due to the effects of that initial damage. In fact, studies have shown that damage and devastation from earthquakes are often as much due to secondary factors (such as fire, flood and electrical shock) as due to the original seismic disturbance itself. Attention has gradually turned to these secondary factors and to methods of minimizing their effect in the event of an earthquake.

The Japanese have been leaders in the area of analyzing the occurrence of electrical fire in the wake of a seismic disturbance. Studies such as "Investigation Reports and Igniting Experiments on the Electrical Causes of Fires Started after the Earthquake in Kobe Area—1995" make direct links between electrical fires and earthquakes, and use specific earthquake data as part of the research base.

Electrical fires occur most frequently when external power disrupted by the seismic even is once again restored. One reason for such fires is that electrical power is oftentimes being supplied to wiring systems damaged by the seismic disturbance.

Hogan (U.S. Pat. No. 4,414,994) notes this problem and suggests a solution. According to Hogan, a safety system can be built which detects earthquakes having a magnitude greater than a preset value and which, upon such detection, instantly shuts off electricity, gas and water supplies to a building. The safety system includes a housing containing a normally-open electrical contractor connected between the electric service entrance and the distribution circuit breaker panel. When seismic activity of sufficient magnitude is detected, the normally-open electrical contractor opens, removing power from the circuit breaker panel.

Hogan states that normally-closed solenoid valves can be placed in the gas and water pipelines. The solenoid valves are connected to breakers in the circuit breaker panel such that when power to the breaker panel is cut off, the solenoid valves close, cutting off the water and gas supplied to the building.

The approach described by Hogan is effective in shutting off water, gas and electricity to a building on the occurrence of seismic activity. Any shock of sufficient magnitude will also, however, trigger a shut down. In addition, Hogan's design will shut off water, gas and electricity to a building on occurrence not only of seismic activity but also when electrical power is cut for any reason (e.g., lightning or downed power lines). This design aspect makes the system less useful in a number of household and business applications.

What is needed is a system and method of disabling utilities to a building both during and after an earthquake.

SUMMARY OF THE INVENTION

According to one aspect of the present invention, a system and method of disabling utility service supplied to a building during and after an earthquake is described. A shock sensor for sensing seismic activity is provided and a seismic activity threshold is established. Seismic activity is sensed over time and the seismic activity sensed is compared to the seismic activity threshold. When seismic activity exceeds the seismic activity threshold, utility service is cut off to the building.

BRIEF DESCRIPTION OF THE DRAWINGS

In the following drawings, where the same number reflects similar function in each of the drawings.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Figure 1:
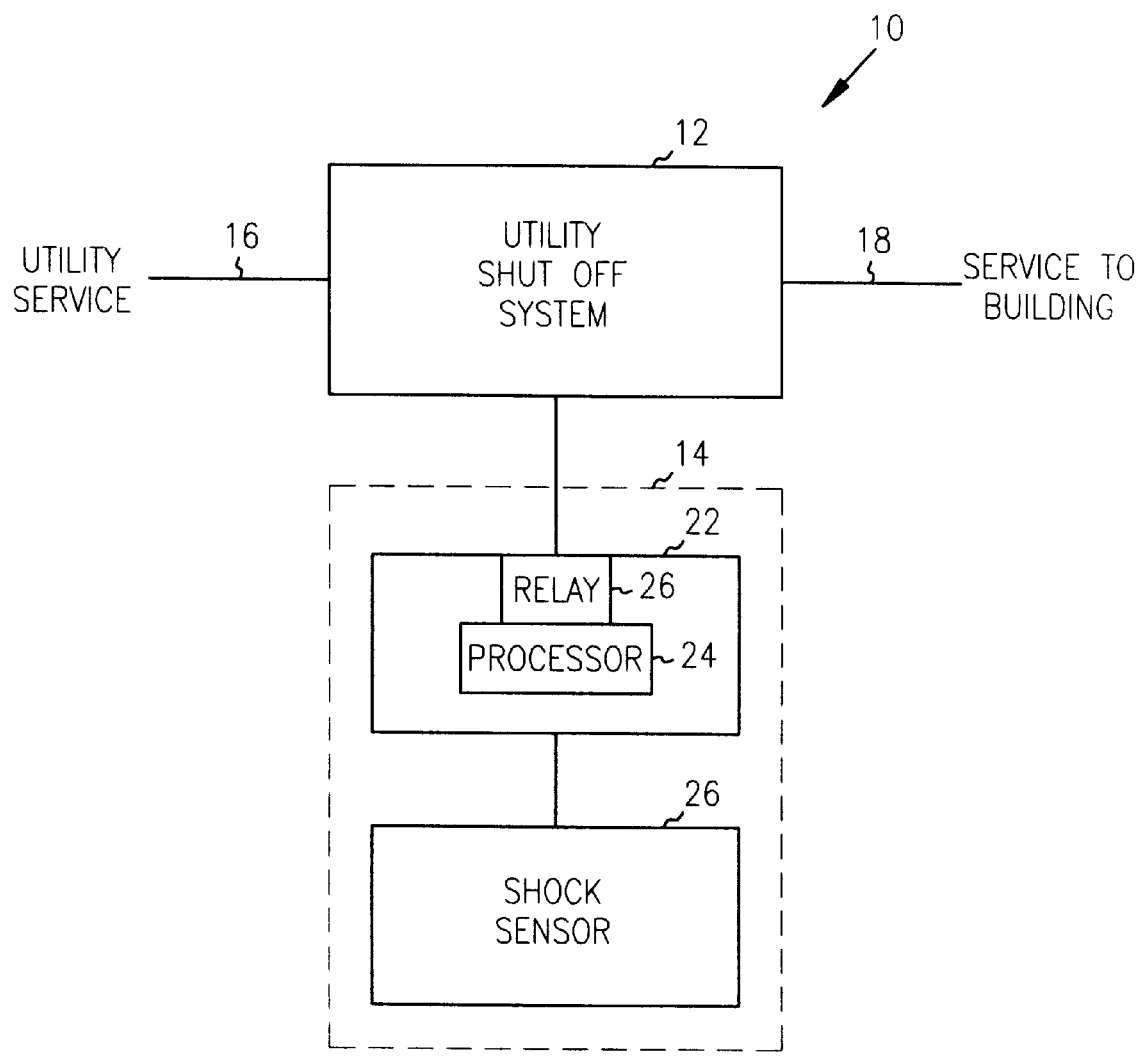
FIG. 1 illustrates a system for disabling utility service supplied to a building according to the present invention.

A system 10 for disabling utility service supplied to a building during and after an earthquake is shown in FIG. 1. In FIG. 1, system 10 includes a shut off module 12 and a shock detector 14. Shut off module 12 is disposed between utility service 16 and building service 18 and acts to shut off one or more services (e.g., electricity, gas or water) to the building on detection of an earthquake above a certain threshold.

In one embodiment, shock detector 14 includes a shock sensor 20 and a shock detection circuit 22 connected to shock sensor 20. In one embodiment, as is shown in FIG. 1, shock detection circuit 22 includes a processor 24 and a shunt relay 26. In one such embodiment, processor 24 is electrically connected to shock sensor 20 and to shunt relay 26.

Figure 2:
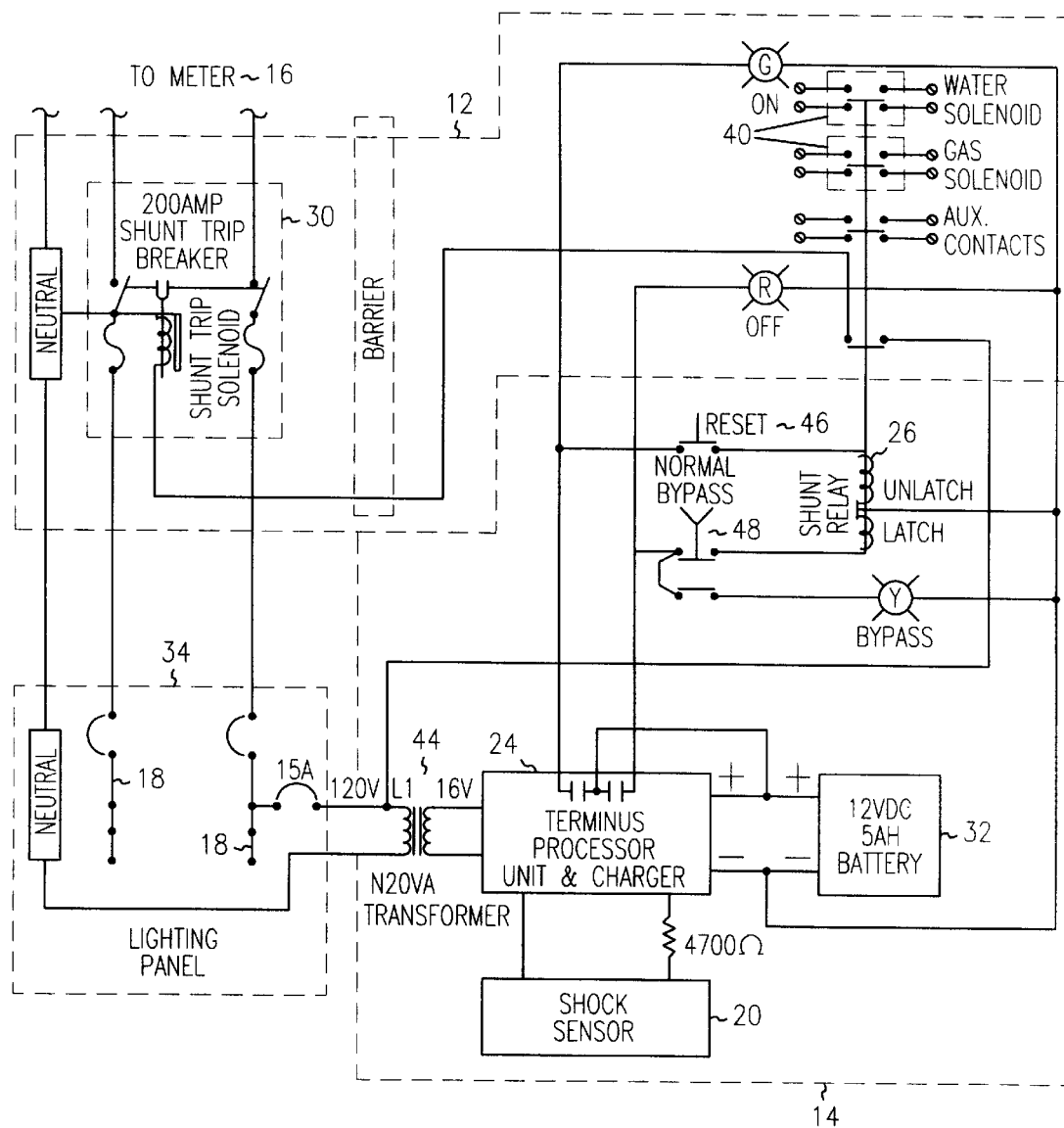
FIG. 2 illustrates one embodiment of the system of FIG. 1.

In one embodiment, as is shown in FIG. 2, shut off module 12 includes a normally-open shunt trip breaker 30 disposed between an electrical source 16 and the building's internal electrical system 18. Shunt trip breaker 30, when energized, conducts electricity between electrical source 16 and the building's internal electrical system 18.

In operation, processor 24 processes signals received from shock sensor 20 and issues a first signal on detecting seismic activity above a predefined seismic activity threshold. In turn, shunt relay 26 opens the normally-open shunt trip breaker on receipt of the first signal, de-energizing shunt trip breaker 30 and cutting electricity to internal electrical system 18. System 10 includes a reset switch 46 which can be depressed in order to reset system 10 and restore electricity to internal electrical system 18.

In one embodiment, system 10 is physically located between an external power source 16 and an interior electrical breaker panel box 34. One such embodiment is shown in FIG. 2. Other connections to the building's wiring system are also possible. For instance, system 10 could be inserted on individual electrical lines running from box 34 to the internal house wiring, or could be incorporated into the breakers themselves. In such an embodiment a single shock detection circuit 22 connected to breaker panel box 34 would serve to open the circuits for each electrical line running from box 34 using a mechanism such as is described above.

A system such as that shown in FIGS. 1 and 2 can also be used to cut off utilities such as gas and water to a house during and after an earthquake. A shut off system for disabling a utility service such as water or gas supplied to a building during and after an earthquake is shown in FIG. 2. In FIG. 2, shut off module 12 is disposed between a utility service and the building. Shut off module 12 includes a normally-closed solenoid valve 40 disposed between a utility service source (e.g., water mains or gas mains) and the building's internal service infrastructure (e.g., water piping or gas piping). Solenoid valve 40, when energized, permits the flow of a product such as gas or water between the utility service source and the internal service infrastructure.

In operation, processor 24 processes signals received from shock sensor 20 and issues a first signal on detecting seismic activity above a predefined seismic activity threshold. In turn, shunt relay 26 closes solenoid valve 40 on receipt of the first signal, cutting the gas or water service to the building. Reset switch 46 can be depressed in order to reset system 10 and restore product flow to the building's internal piping.

In one embodiment, processor 24 issues the first signal when seismic activity above a predefined magnitude is detected by shock sensor 20 over a predefined period of time. Shock sensor 20 may, for instance, be a standard shock sensor (such as the Terminus SP3237 shock sensor) or a damped shock sensor (such as the Terminus SP3237D shock sensor). The damped shock sensor can be useful in filtering noise, or in integrating across seismic activity. In one embodiment, processor 24 is a processor such as Terminus SP3268.

In one embodiment, processor 24 is connected through a transformer 44 to breaker panel box 34 and receives electrical power through transformer 44. In one such embodiment, processor 24 includes a battery 32 and a charging unit (not shown). In such an embodiment, system 10 is designed to operate under back up battery power to permit the control of the flow of a product such as gas or water without external electrical power. In addition, if an earthquake should occur during a power outage, system 10 will be activated by battery 32 and will trip shunt trip breaker 30 as soon as power is re-established, allowing the power to be reset manually when it is safe to do so.

In one embodiment, such as is shown in FIG. 2, system 10 includes a bypass switch 48 which can be used to turn off system 10 without disrupting the electrical power.

In one embodiment, green (G), red (R) and yellow (Y) lights are provided to indicate system operation. Green light G is lighted when the system is operating normally. Red light R is lighted when seismic activity has shut down system 10. Yellow light Y is lighted when system 10 is turned off by, for instance, depression of bypass switch 48.

Figure 3:
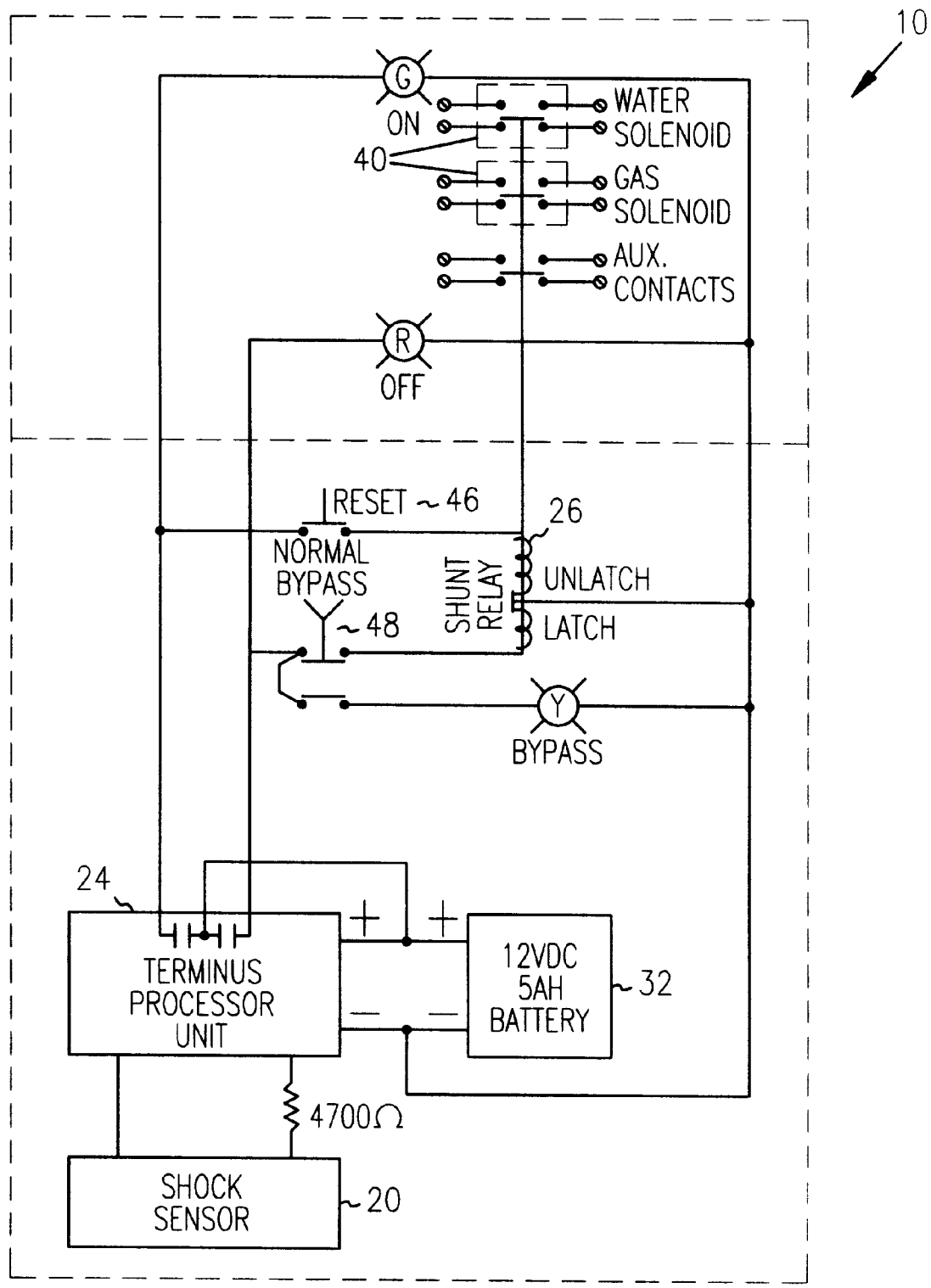
FIG. 3 illustrates another embodiment of the system of FIG. 1.

Another embodiment of system 10 is shown in FIG. 3. In FIG. 3, shock sensor 20 detects shocks. Processor 24 is connected to shock sensor 20; processor 24 issues a first signal when seismic activity above a predefined magnitude is detected by shock sensor 20 over a predefined period of time. In one such embodiment, shunt relay 26 is connected to processor 24 and solenoid valves 40; shunt relay 26 closes the normally-closed valves 40 on receipt of the first signal.

In the embodiment shown in FIG. 3, system 10 is powered entirely by battery unit 32. System 10 is designed to permit the control of the flow of a product such as gas or water without external electrical power. Such a design can be used advantageously in remote installations.

Disturbances in the 6.0–6.9 magnitude range are of sufficient magnitude and intensity to create significant damage, and must, therefore, be considered of serious financial and human concern. In one embodiment, therefore, seismic disturbances beginning at approximately a 6.0 range are targeted. Such a setting provides maximum preventative value, detecting seismic activity before damage exists and yet preventing premature shutdown of power.

In operation, shock sensor 20 is set at an established equivalent Richter Scale reading corresponding to the desired threshold range. If a seismic disturbance at or above that reading is detected for a sufficient period of time, processor 24 signals shunt relay 26 to induce electrical power shut down. In one embodiment electrical power is shut off if a vibration or shock continues at its set intensity for a three second interval. This approach reduces the possibility that an electrical fire will be caused by the primary shock or disturbance.

Figure 4:
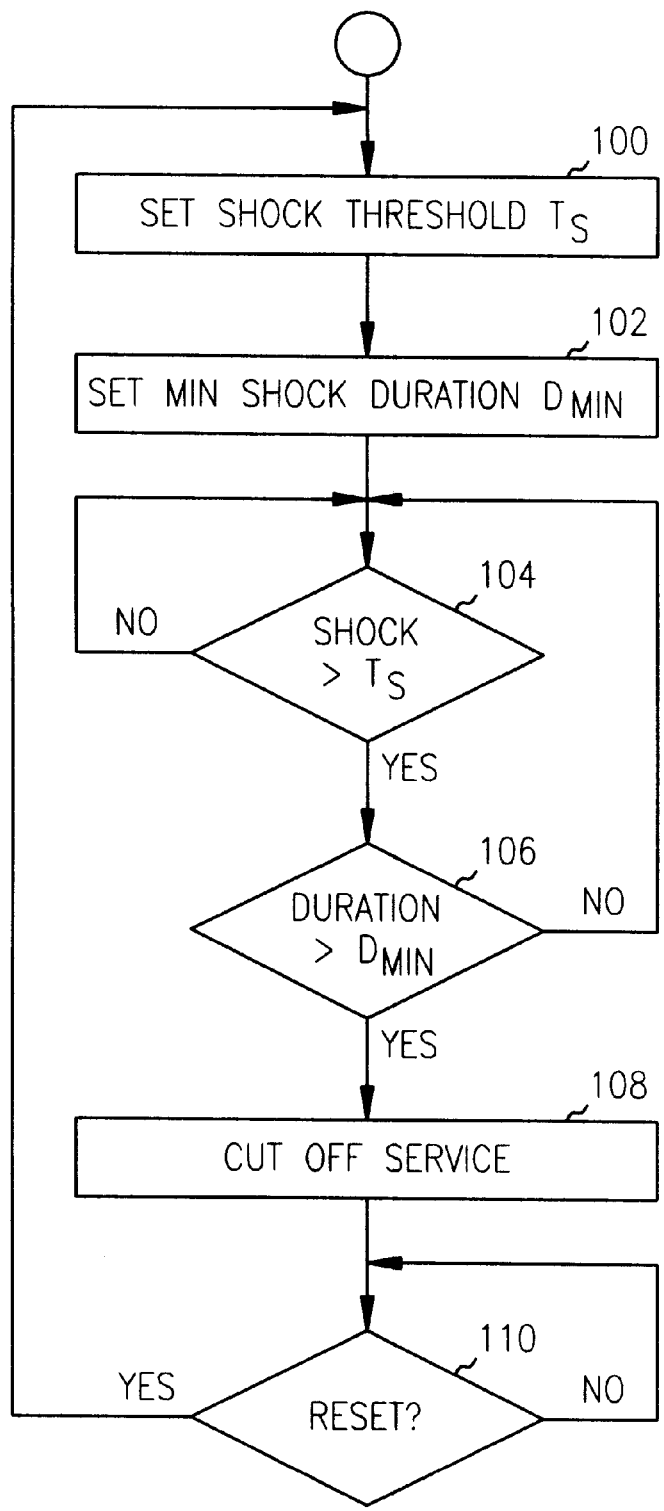
FIG. 4 is a flow chart showing operation of a shock detection circuit in the system of FIG. 1.

A more detailed explanation of operation of one embodiment of processor 24 in system 10 is shown in FIG. 4. At 100, a shock threshold $T_S$ is set to a predefined value (e.g., a value equivalent to 6.0on the Richter scale). At 102, a minimum duration $D_{min}$ is set to a predefined value (e.g., three seconds). At 104, processor 24 waits for a signal from sensor 20 that a shock of sufficient magnitude to trigger sensor 20 has been received. If the shock is above shock threshold $T_S$, control moves to 106, where processor 24 determines if the minimum duration threshold has been passed. If not, control moves to 104 and processor 24 continues to monitor for shocks exceeding shock threshold $T_S$. If, however, the minimum duration threshold has been passed, control moves to 108 and processor 24 cuts off service (e.g., by sending a signal to shunt relay 26). Control then moves to 110, where processor 24 remains until reset using reset button 46.

In one embodiment, as is discussed above, system 10 includes a reset button 46 which can be used by the owner of the structure to reset system 10 when it is safe to do so. For the owner, this is an opportunity to check the building wiring system, without fear of an electrical fire being caused by the premature energizing of external power source 16. If all is well, system 10 is simply reset using reset button 46. Such an approach minimizes the dangers of the restoration of external power to a potentially vulnerable household system.

CONCLUSION

Disturbances in the 6.0–6.9 magnitude range are of sufficient magnitude and intensity to create significant damage, and must, therefore, be considered of serious financial and human concern. The system and methods described above detect the presence of seismic activity and takes steps to prevent fires as a result of the seismic activity.

The system is capable of shutting down any form of utility service to a building, including electricity, liquids and gasses. In addition, the system is designed such that by depressing a single reset switch, all utility services can be restored to the building. The reset button therefore puts the owner of the building in control, giving him an opportunity to check the internal service infrastructure before resetting the system.

Finally, system 10 is designed such that power outages not caused by an earthquake do not shut down system 10.

Instead, power restores itself without intervention by the building owner.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of thepresent invention. Therefore, it is intended that this invention be limited only by the claims and the equivalents thereof.

What is claimed is:

1. A method of disabling utility service supplied to a building during and after an earthquake, the method comprising:
   providing a shock sensor for sensing seismic activity;
   establishing a seismic activity threshold, wherein establishing a seismic activity threshold includes setting a shock threshold and a minimum shock duration;
   sensing seismic activity over time;
   comparing the seismic activity sensed to the seismic activity threshold; and
   when seismic activity exceeds the seismic activity threshold, cutting off utility service to the building.

2. The method of claim 1, wherein comparing the seismic activity to the seismic activity threshold includes classifying seismic activity over time within one or more types of seismic activity and setting the seismic activity threshold accordingly.

3. The method of claim 1, wherein cutting off utility service to the building includes breaking an electrical path between an external electrical service source and building electrical wiring.

4. The method of claim 3, wherein breaking the electrical path includes opening a circuit breaker connected between the external electrical service source and the building electrical wiring.

5. The method of claim 1, wherein cutting off utility service to the building includes restricting product flow between an external utility service source and an appliance within the building.

6. The method of claim 5, wherein the product restricted is water.

7. The method of claim 5, wherein the product restricted is gas.

8. The method of claim 5, wherein the product restricted is electricity.

9. The method of claim 1, wherein sensing seismic activity over time includes integrating a signal from the shock sensor.

10. A shut off system for disabling utility service supplied to a building during and after an earthquake, wherein the building has an internal electrical system, the shut off system comprising:
    a shut off module established between the utility service and the building wherein the shut off module includes a normally-open shunt trip breaker disposed between an electrical source and the building's internal electrical system, wherein the shunt trip breaker, when energized, conducts electricity between the electrical source and the building's internal electrical system; and
    a shock detector wherein the shock detector includes:
       a shock sensor; and
       a shock detection circuit connected to the shock sensor, wherein the shock detection circuit includes a processor and a shunt relay, wherein the processor is electrically connected to the shock sensor and the shunt relay;
    wherein the processor processes signals received from the shock sensor and issues a first signal on detecting seismic activity above a predefined magnitude for a predetermined period of time; and
    wherein the shunt relay opens the normally-open shunt trip breaker on receipt of the first signal.

11. The system according to claim 10, wherein the shut off module further includes a normally-closed solenoid valve disposed between a utility service source and internal service infrastructure, wherein the solenoid valve, when energized, permits product flow between the utility service source and the internal service infrastructure;
    wherein the solenoid valve is connected to the shunt relay and wherein the shunt relay closes the solenoid valve on receipt of the first signal.

12. The system according to claim 11, wherein the utility service source is a water main.

13. The system according to claim 11, wherein the utility service source is a gas main.

14. The system according to claim 10, wherein the shock detection circuit includes a reset switch for resetting the shut off module.

15. The system according to claim 10, wherein the shock detection circuit includes a bypass switch for disabling the shut off module.

16. A shut off system for disabling utility service supplied to a building during and after an earthquake, the shut off system comprising:
    a shut off module established between the utility service and the building wherein the shut off module includes a normally-closed solenoid valve disposed between a utility service source and internal service infrastructure, wherein the solenoid valve, when energized, permits product flow between the utility service source and the internal service infrastructure; and
    a shock detector, wherein the shock detector includes:
       a shock sensor; and
       a shock detection circuit connected to the shock sensor, wherein the shock detection circuit includes a processor and a shunt relay, wherein the processor is electrically connected to the shock sensor and the shunt relay;
    wherein the processor processes signals received from the shock sensor and issues a first signal on detecting seismic activity above a predefined magnitude for a predetermined period of time; and
    wherein the shunt relay closes the solenoid valve on receipt of the first signal.

17. The system according to claim 16, wherein the utility service source is a water main.

18. The system according to claim 16, wherein the utility service source is a gas main.

19. The system according to claim 16, wherein the processor includes battery backup power and wherein the system is designed to permit the flow of product in the absence of external electrical power.

20. The system according to claim 16, wherein the shock detection circuit includes a reset switch for resetting the shut off module.

21. The system according to claim 16, wherein the shock detection circuit includes a bypass switch for disabling the shut off module.

* * * * *